A. Kirn,
Meat Cutter.
No. 96,326. Patented Nov. 2, 1869.
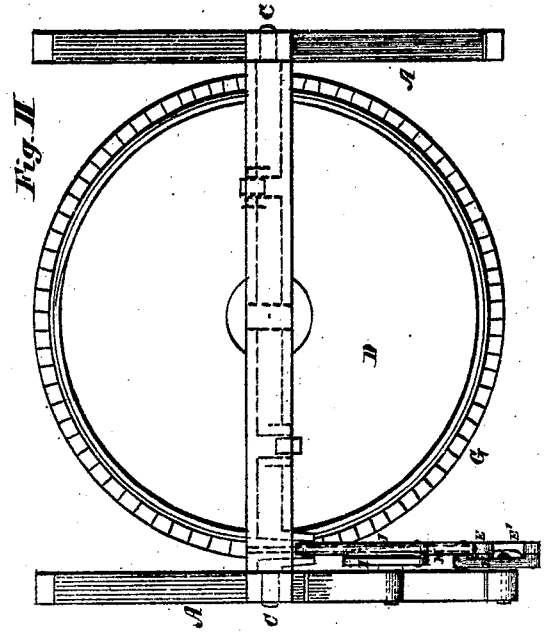
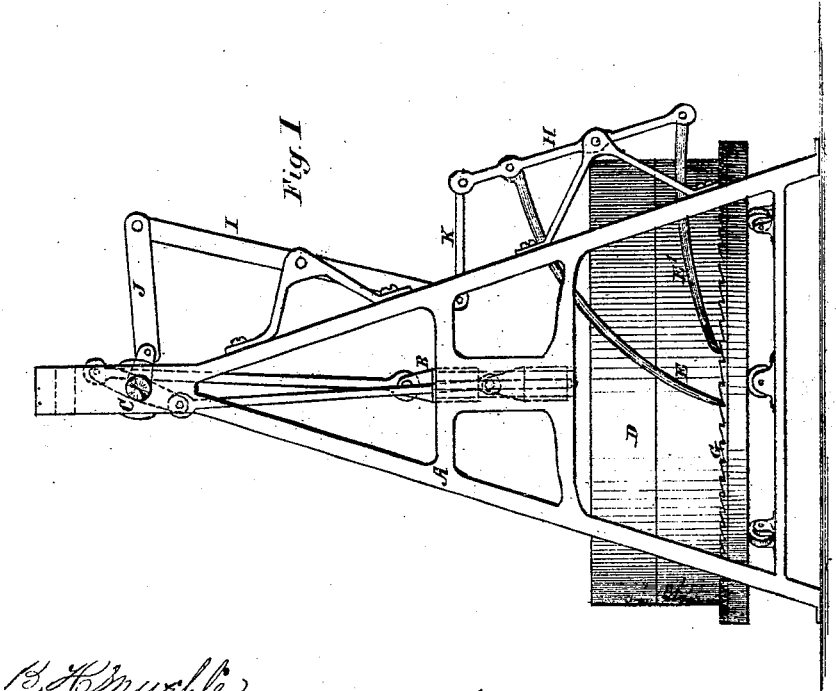

United States Patent Office.

ANTON KIRN, OF BUFFALO, NEW YORK, ASSIGNOR TO HIMSELF AND JOHN E. KRASSELT, OF SAME PLACE.

Letters Patent No. 96,326, dated November 2, 1869.

IMPROVED MEAT-CUTTING MACHINE.

The Schedule referred to in these Letters Patent and making part of the same.

*To all whom it may concern:*

Be it known that I, ANTON KIRN, of the city of Buffalo, in the county of Erie, and State of New York, (assignor to myself and JOHN E. KRASSELT, of the same place,) have invented a certain new and improved Meat-Cutting Machine; and I do hereby declare that the following is a full, clear, and exact description thereof, reference being had to the accompanying drawings, making a part of this specification, in which—

Figure I is a side elevation.

Figure II is a top plan view.

The nature of this invention consists in an improved device for giving the chopping-block of a meat-cutting machine the required intermittent rotary motion.

Letters of like name and kind refer to like parts in each of the figures.

A A represent the frame-work of a meat-cutting machine;

B B, the knives;

C, the main driving-shaft; and

D, the circular chopping-block.

All these parts are of common construction.

E and E' represent two pawls or dogs, the ends of which engage with and rest upon the circular ratchet-wheel G, connected to the rim of the block D.

These two pawls are connected to the opposite ends of a two-armed lever, H, which is hinged to the frame A.

An oscillating motion is imparted to this lever as follows:

A crank upon the main shaft C is connected to one arm of the lever I by means of the rod J, and the opposite end of this lever is connected with the lever H by means of the rod K. Thus the revolution of the main shaft C causes the levers I and H to oscillate, and hence the chopping-block is pushed around its central fulcrum, first by one of the pawls and then by the other, and so on alternately.

The crank, which operates the pawls E and E', is placed at such an angle to those from which the knives are suspended that the block will be moved only whenever the knives are in an elevated position, and while either of the knives is cutting through the meat upon the block, the latter remains stationary.

What I claim as my invention, and desire to secure by Letters Patent, is—

In a meat-cutting machine, in which the cutting-knives are connected to a horizontal crank-shaft, and operate upon a circular block revolving around a central pivot, the system of levers and rods H I J K, in combination with the crank-shaft C, pawls E and E', and circular ratchet-bar G upon the block D, all these parts being arranged and operating substantially as herein described.

ANTON KIRN.

Witnesses:
   B. H. MUEHLE,
   CHARLES C. SHORT.